No. 893,294. PATENTED JULY 14, 1908.
B. M. ASLAKSON.
LAY SHAFT DRIVE.
APPLICATION FILED JAN. 14, 1908.
2 SHEETS—SHEET 1.
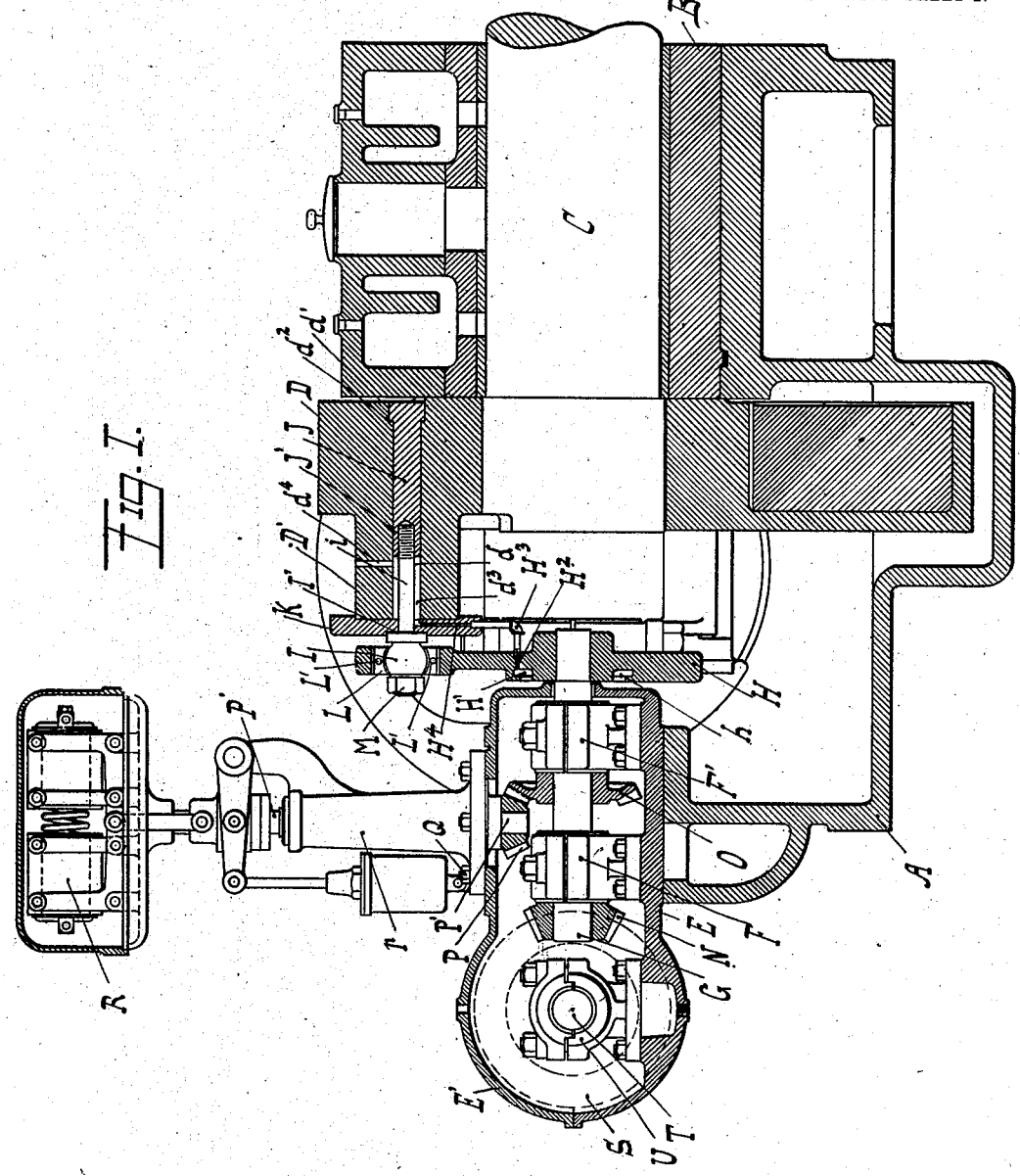
Fig. I.
WITNESSES:
Albert Malsin
L. H. van Haaften.
INVENTOR
Baxter M. Aslakson
BY
Frank W. Ashley
ATTORNEY

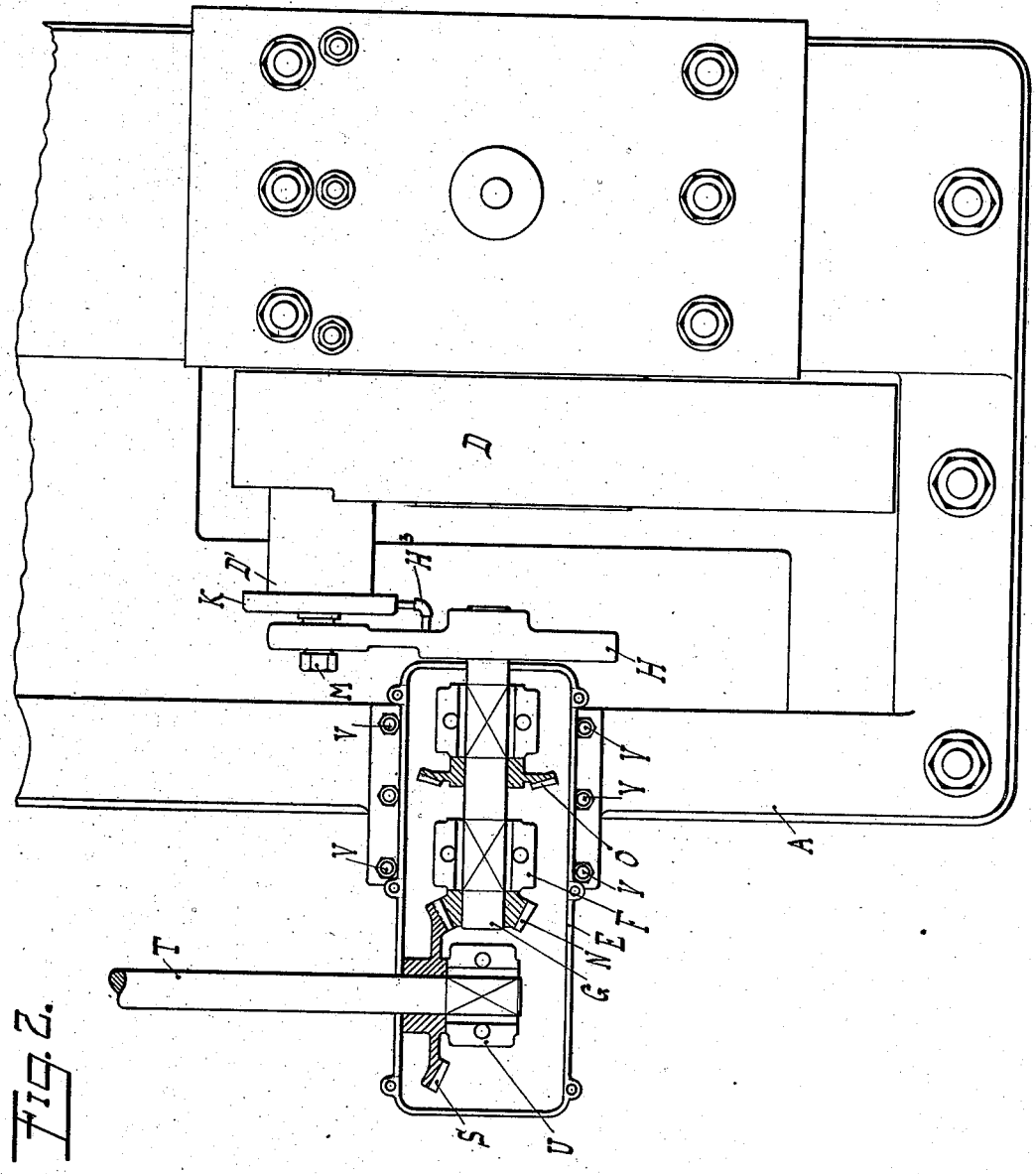

UNITED STATES PATENT OFFICE.

BAXTER M. ASLAKSON, OF SALEM, OHIO.

LAY-SHAFT DRIVE.

No. 893,294.  Specification of Letters Patent.  Patented July 14, 1908.

Application filed January 14, 1908. Serial No. 410,731.

*To all whom it may concern:*

Be it known that I, BAXTER M. ASLAKSON, a citizen of the United States, residing at Salem, Columbiana county, Ohio, have invented new and useful Improvements in Lay-Shaft Drives, of which the following is a specification.

My invention relates to gas engines and the object thereof is to provide a construction by means of which a lay shaft may be driven from the crank pin of the engine in a simple and efficient manner.

A further object is to provide means whereby the governor of the engine may also be driven from the crank pin, and to provide means to effect lubrication of the main crank pin connection. The function of the lay shaft in this connection is to operate the exhaust valves and inlet valves of a four cycle gas engine, the necessary cams or eccentrics which operate the valves, usually being mounted thereon, and therefore the lay shaft is usually driven one revolution while the main shaft is being driven two.

Referring to the drawings which form a part of this specification,—Figure 1, is a cross sectional view through one of the main shaft bearings and main crank, and the lay shaft crank and gears, disclosing the engine main shaft, and the auxiliary shaft mounted in their relative positions. Fig. 2, is a plan view of the engine crank and lay shaft crank, and disclosing a portion of the lay shaft.

A, indicates a portion of the bed frame of a gas engine having mounted thereon the box B, which supports one end of the main shaft C.

D, indicates the main crank of the engine which is provided with a crank pin D'.

E, indicates a casting provided with a cover E', which is mounted on the bed frame A, and mounted therein in suitable boxes F and F', is a shaft G, which is mounted in alinement with main shaft C, and mounted thereon at one end is a crank H, which is driven by means of crank pin I, connected to crank pin D', as follows: The crank D and pin D' is provided with a bore $d$, which is enlarged in diameter at $d'$, thereby forming a shoulder $d^2$, against which the inner head of the bolt J abuts. The bolt J extends through the main crank and extends within the crank pin D' a short distance, thus strengthening the pin at the point where it joins the crank D, and is provided with a tapped end J', into which one end of the crank pin I is screwed as shown.

The crank pin I is provided with a shoulder I', which abuts against a cap K, which serves to hold the connecting rod (not shown) on the crank pin D', and also serves as an abutment whereby bolt J may be drawn into position and retained therein, as will be readily understood.

The shank $i$ of the crank pin I, is of less diameter than the bore $d$, thereby forming a chamber $d^3$, having a passage $d^4$, leading to the surface of the crank pin D'. Formed in the crank H is an annular chamber H', which is in open communication with the atmosphere at its left side by an annular groove $h$, which extends in a circle concentric with the chamber H', through which oil is introduced through a pipe which leads thereto (not shown) to within the chamber H', whence it is thrown by centrifugal action through passage H², pipe H³, and passage H⁴ to chamber $d$, and thence through passage $d^4$ to the surface of the crank pin D'.

The bearing surface of the crank pin I is round in form and rests in a box bearing L, which is held in the crank H, by bolts which pass through the holes L', and a nut M screws on the end of the crank pin I, as shown. This arrangement provides a ball joint between the crank pin I and crank H, so that any wear tending to throw the main shaft out of alinement with the auxiliary shaft G, will not cause undue heating or strain of crank pin I.

Mounted on shaft G are two gears N and O respectively, the gear O being in mesh with a gear P, which is mounted on the governor drive shaft P' which extends through the pedestal $p$, which is mounted on the casing E, as shown, and secured thereto by stud bolts and nuts Q, the governor proper being indicated by R.

The gear N is in mesh with and drives the gear S, which is mounted on the lay shaft T, one end of which is supported in the box U, which is mounted in the casing E. The gear S is double the diameter of the gear N, and is therefore driven at one half of the speed of the latter.

The casing E is secured to the bed frame by stud bolts and nuts V—V—V, etc., as shown. The boxes U, F, and F', are of the same height from the base to the center of the bearings and have the same diameter and length of bearing, so that they are interchangeable and may be cast from the same pattern.

By the simple and durable construction shown, the objects of the invention are fully attained, and a very compact construction secured.

Having thus described my invention, what I claim as new and desire to secure by Letters Patent, is—

1. An engine having a frame provided with a bearing for a main shaft; a main shaft supported therein; a crank carried by said shaft and provided with a crank-pin; a lay shaft; an auxiliary shaft geared thereto and provided with a crank; and means for connecting said last named crank to said crank pin.

2. An engine having a frame provided with a bearing for a main shaft; a main shaft supported therein; a crank carried by said shaft and provided with a crank-pin; a lay shaft; an auxiliary shaft geared thereto and provided with a crank and supported with its axis in line with the axis of said main shaft; and means for connecting said last named crank to said crank-pin.

3. An engine having a frame provided with a bearing for a main shaft; a main shaft supported therein; a crank carried by said shaft and provided with a crank-pin; a lay shaft; an auxiliary shaft geared thereto and provided with a crank and supported with its axis in line with the axis of said main shaft; and a second crank-pin connected to and projecting from said first crank-pin and adapted to drive said second crank, as set forth.

4. An engine having a frame provided with a bearing for a main shaft; a main shaft supported therein; a crank carried thereby and provided with a crank-pin; a lay shaft; an auxiliary shaft geared thereto and provided with a crank, and supported with its axis in line with the axis of said main shaft; a second crank-pin connected to and projecting from said first crank pin and provided with a ball shaped surface at one end; and adapted to drive said second crank and permit of relative lateral movement between said cranks.

5. An engine having a frame provided with a bearing for a main shaft; a main shaft supported therein; a crank carried thereby and provided with a crank-pin; a lay shaft; an auxiliary shaft geared thereto and provided with a crank, and supported with its axis in line with the axis of said main shaft; a second crank-pin connected to and projecting from said first crank-pin and having a ball shaped surface at one end located in the end of said second crank, said second crank having an annular oil chamber; and means for conducting oil therefrom to said main crank-pin.

6. An engine having a frame provided with a bearing for a main shaft; a main shaft supported therein, a crank carried thereby and provided with a crank-pin; a lay shaft; an auxiliary shaft geared thereto and provided with a crank at one end and having a gear; a governor driven by said gear; and a second crank-pin connected to and projecting from said first crank-pin, and having a ball bearing surface and connected to said second crank, as and for the purpose set forth.

7. An engine having a frame provided with a bearing for a main shaft; a main shaft supported therein; a crank carried thereby and provided with a crank-pin; a lay shaft; an auxiliary shaft geared thereto and provided with a crank at one end, and having a gear; a housing for said auxiliary shaft; a governor mounted thereon and driven by said gear on said auxiliary shaft; and a second crank-pin connected to and projecting from said first crank-pin, and connected to said second crank.

8. An engine having a frame provided with a bearing for a main shaft; a main shaft supported therein; a crank carried thereby and provided with a crank-pin; a lay shaft longitudinally disposed relative to the engine frame; an auxiliary shaft geared thereto and having a crank mounted thereon, and a gear mounted thereon, and having its axis in line with the axis of said main shaft; a housing for said auxiliary shaft; a governor mounted thereon and driven by said gear on said auxiliary shaft; a second crank-pin connected to and projecting from said first crank-pin and having a ball bearing, and connected to said second crank; said second crank having an annular oil chamber; and means for conducting oil from said chamber to the surface of said first named crank-pin.

In testimony whereof, I have signed my name to this specification in the presence of two subscribing witnesses, this tenth day of January, 1908.

BAXTER M. ASLAKSON.

Witnesses:
FRANK M. ASHLEY,
A. G. SCHARPS.